Sept. 7, 1965 I. C. GRUET 3,205,345

CONVERGENCE ERROR REDUCTION APPARATUS

Filed July 17, 1962 3 Sheets-Sheet 1

IVAN C. GRUET INVENTOR

BY David A. Roth

PATENT ATTORNEY

Sept. 7, 1965 I. C. GRUET 3,205,345

CONVERGENCE ERROR REDUCTION APPARATUS

Filed July 17, 1962 3 Sheets-Sheet 2

IVAN C. GRUET INVENTOR

BY David A. Roth

PATENT ATTORNEY

CONVERGENCE ERROR REDUCTION APPARATUS

Filed July 17, 1962 3 Sheets-Sheet 3

IVAN C. GRUET INVENTOR

BY David A. Roth

PATENT ATTORNEY

United States Patent Office 3,205,345

Patented Sept. 7, 1965

3,205,345 CONVERGENCE ERROR REDUCTION APPARATUS

Ivan C. Gruet, Montclair, N.J., assignor to Esso Research and Engineering Company, a corporation of Delaware Filed July 17, 1962, Ser. No. 210,414
11 Claims. (Cl. 235—184)

This invention relates to either circuits, apparatus, methods, or various combinations of the three, any of which can be used with computers and similar devices to assist in obtaining solutions to a wide variety of problems. In particular, the invention relates to circuits, e.g. electronic circuits, which compare calculated values of variables to known quantities of the same variables to generate error signals which adjust unknown conditions and/or parameters by a negative feedback technique. The foregoing is referred to herein as "converging."

Computers can be very loosely grouped into two main classes, that is, analog computers and digital computers. This invention is primarily concerned with analog computers although, in most analog computers, there are certain digital characteristics and vice versa. Analog computers can be divided into three main classes on the basis of the hardware components of the computer. These are the mechanical analog computers which are primarily general purpose computers, electromechanical analog computers which generally refer to computers which consist of motors, potentiometers, pen recorders, and the like, electronic computers, and combinations of the foregoing. Most analog computers fall into the electromechanical category except for the high speed, repetitive type of analog computers which are primarily electronic computers.

By electronic analog computer is meant a computer for solving differential equations in which most, if not all, of the computations are accomplished by purely electronic means. An electronic analog computer can repetitively solve a problem many times a second, for example, a typical one can repeat from 10 to 60 times per second.

A type of analog computer which is classified functionally, rather than by its hardware components, is a differential analyzer. There are differential analyzers which are either pure electronic or of the electromechanical type. The electromechanical type usually displays a solution graphically on an electromechanical plotter to produce a permanent record. The pure, or relatively pure, electronic differential analyzer is generally of the type mentioned above which produces a repetitive solution many times a second. This type of computer usually is employed in conjunction with a cathode ray oscilloscope to visually display the solution of the problem in all its changing aspects.

Since analog computers compute by means of electronic circuits which are analogs of the problem to be solved, it might be interesting to consider the analogs that can be used by a typical differential analyzer. For instance, quantity representation is usually by voltage. External links for input are usually cabling for logic and dial settings of a potentiometer for data. Output is usually a graphic presentation, i.e. recorder or oscilloscope. Coefficients of problems are introduced using set positions of potentiometers. Operations are performed mostly by the basic computing elements described above such as amplifiers and nonlinear components such as multipliers, dividers, and the like.

Although the invention is broadly applicable to all classes of computers, it is particularly applicable to general purpose computers and differential analyzers, especially electronic or electromechanical differential analyzers. These analyzers by their very nature are composed of mechanical or electrical, preferably electronic, circuits which integrate so as to solve differential equations.

An analog computer can also be referred to as a simulator. A variable will be kept in a direct relationship with other variables during the time of problem solution.

The invention is most advantageously used in connection with a general purpose analog computer which is usually of the electronic analog type. This type of computer can perform continuous integrations or differentiations as well as any of the other basic mathematical operations. The basic computing elements of a typical general purpose analog computer are electronic analogs of mathematical blocks.

Most computations can be accomplished by combining in the proper way these basic computing elements. For example:

To generate the time integral of a variable an integrating amplifier is used.

To simulate the behavior of variables a function generator is used.

To multiply variables electronic or servo multipliers are used.

To add or subtract variables summing amplifiers are used

To multiply a variable by a constant attenuators are used.

The basic computing elements are well known to the art and need not be described herein in further detail. Each of the electronic analogs of a mathematical block has input and output terminals. These terminals are consolidated in one area on the computer by means of a removable patch panel. These patch panels are then properly plugged up with patch cords, preferably when removed from the computer. The patch panel when plugged with patch cords is then attached to the computer. This hooks up the proper terminals.

In most practical applications of computers, e.g. general purpose analog computers, a particular problem is reduced to mathematical expressions involving differential equations. Next, the expressions are converted to an electronic circuit diagram. This diagram serves as a guide to patch the board and hence indirectly program the computer. Entry of coefficients is accomplished by setting potentiometers. The computer acts on the electronic circuit using the entered constants and/or parameters to give the desired answers. These answers are usually either point values readable on a voltmeter following selection of any standard analog component block output or, more likely, as lines on a chart or traces on an oscilloscope.

Answers are no better than the mathematical model assumed and/or the electronic circuit programmed on the computer. Due to lack of storage, actual data are usually not entered in the computer and automatic correlation is not done. To actually match computed profiles, the standard technique used requires hand adjustment of potentiometers until the match is achieved. Multiple adjustment of more than three potentiometers is not practical even using repetitive operation mode with display on an oscilloscope. A good operator can only change two parameters at a time. To cover the entire set of constants may require an infinite time since an infinite number of combinations may be needed before a complete match can be obtained. Therefore, it would be immensely desirable if means were available to interject actual data into the computer so as to adjust automatically and simultaneously the mathematical expressions acted upon by the computer in the light of such actual data.

Therefore, it is an object of this invention to provide equipment, circuitry and techniques to use interjected actual data values into a computer so that the calculated profile being generated converges on at least one known data point.

A further object is to have all profiles generated by the computer converge on all known data points.

In brief, a typical operation of the invention will be as follows. Samples of calculated dependent and indepenlent variables will be obtained. These samples, i.e. calculated values, are compared with true ascertained values, i.e. data points, in order to generate a set of error signals which result from the difference between true and sampled calculated values. By data points it is meant either an experimentally measured value, a known condition, a desired condition and/or a combination of the foregoing. The error signals are integrated, preferably in a period of time within the microsecond range in "convergence" integrators. The respective outputs from the "convergence" integrators are then fed back in accordance with negative feedback principles, to the computer circuits that characterize adjustable quantities. Then a new set of error signals is generated which differs in magnitude from the first one. As pointed out above, this can be repeated from about 10 to 60 times a second. The corrected values obtained through convergence are cumulatively held or memorized after each repetitive operation. Thus, after each repetitive error signal a problem condition in the computer operations is adjusted with respect to the cumulative values stored as a result of all preceding error signals. When the exact values for unknown quantities, be it parameter values or boundary conditions, are converged upon then the error signals will be "0" and the outputs of the "convergence" integrators will not change. When further operations of the computer and "convergence" circuits yield the same integrated results, the problem is considered to be "converged." Then all unknown boundary conditions and parameter values can be read directly off the "convergence" integrators. Once converged, the data can be moved according to some critcal path for multidimensional convergence. By boundary condition it is meant an initial or final condition which can be a value or a profile. By parameter value, it is meant a quantity which is constant during a particular run, but can vary from run to run.

The invention can be fully understood by referring to the description herein and claims. It will be understood that in the description herein as a practical matter, many circuits and values will be involved. However, the invention also includes the simplest possible version of the invention wherein only one convergence integrator is used. A description of a preferred embodiment of the invention follows wherein it is used in connection with a general purpose analog computer. The description is presented in conjunction with the accompanying drawings wherein:

To illustrate in detail, suppost the expression $$\frac{dy}{dx}=-ky$$

is the mathematical expression for the problem to be solved. Suppose, further, that $k$ is known and that $y$ is equal to $y_f$ @ $x=x_f$. Then the problem is: what is $y=y_o$ @ $x=x_o$?

Figure 1:
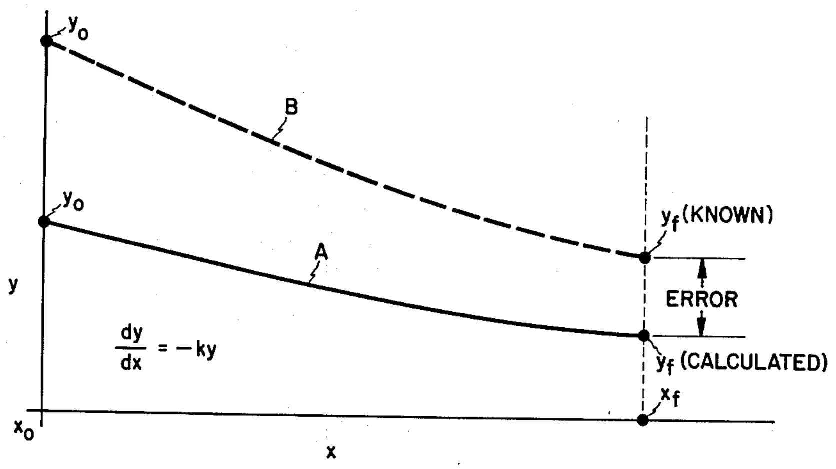
FIGURE 1 shows a graph of two functions, one generated by the computer on the basis of a mathematical expression and the other resulting from the convergence of an error signal.

FIGURE 1 presents a graphic illustration of the problem. Suppose the formula $$\frac{dy}{dx}=-ky$$

produces a curve or profile similar to curve A. However, actual experimental data show that when $x=x_f$ then $y=y_f$ (known) on curve B. However, calculations show that when $x=x_f$ then $y=y_f$ (calculated) on curve A. The difference between $y=y_f$ (known) and $y=y_f$ (calculated) is an error. It is the crux of this invention that this error can be generated as a signal which is imposed onto the mathematical expression that is being solved by a computer in such a way that the point $y_o$ is solved for and a new curve results based on the actual, i.e. observed, data. The new curve is curve B.

Figure 2:
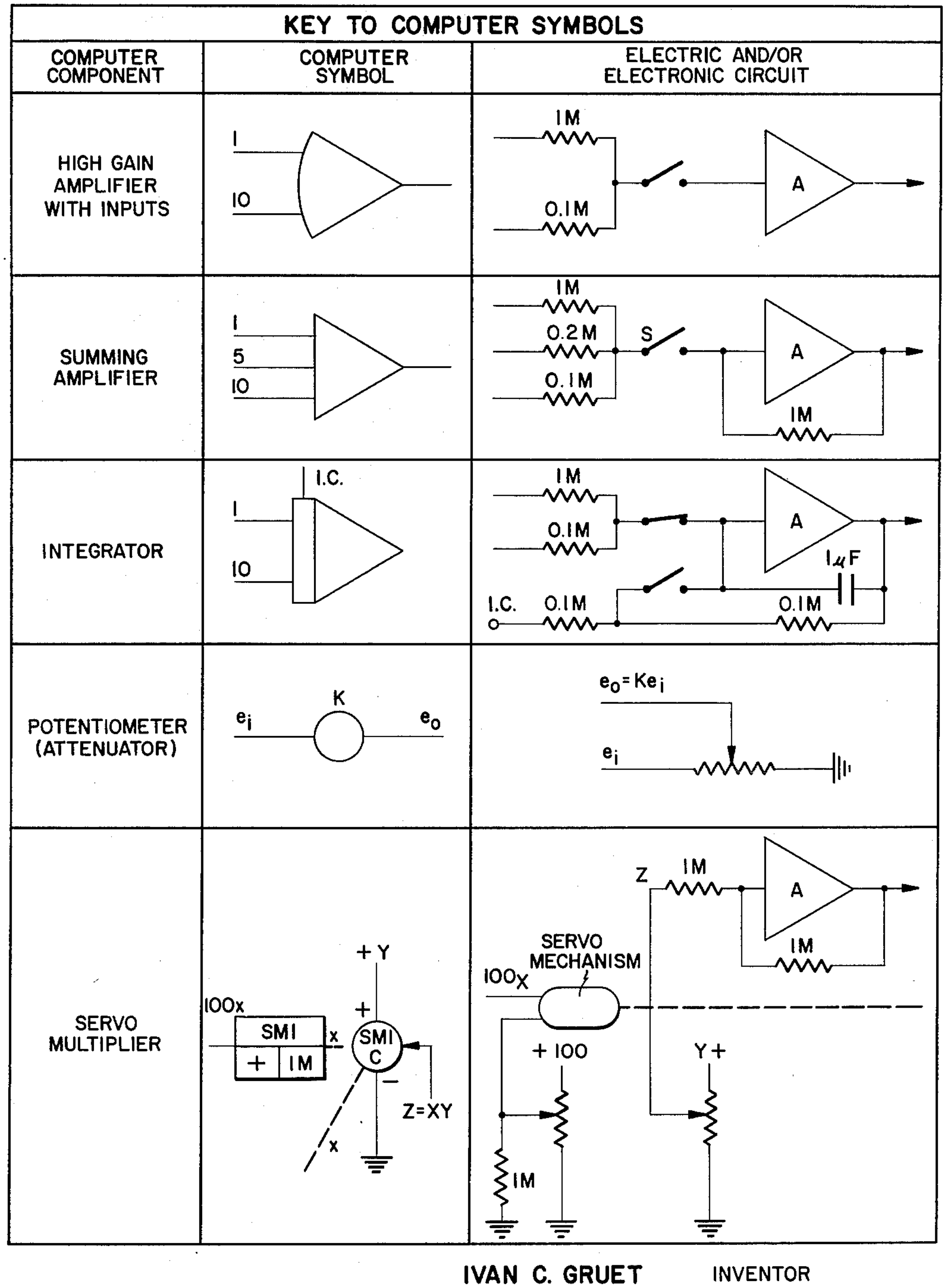
FIGURE 2 shows a key relating standard computer symbols to conventional electrical and/or electronic circuits.

FIGURE 2 is a "Key to Computer Symbols" which shows conventional symbols for standard computer components with corresponding standard electrical and/or electronic circuits. The electrical and/or electronic elements of the circuits and their relationships to each other in each particular circuit in the key are well known to the art and need not be described in further detail. Also, servo mechanisms which are complex arrangements of relays, motors and the like are well known to the art and are suitably described as indicated. I.C. in the integrator stands for initial condition. Computer symbols show imputs to various computer elements as gains as contrasted to conventional electric and/or electronic circuits where they are shown in terms of resistances.

Figure 3:
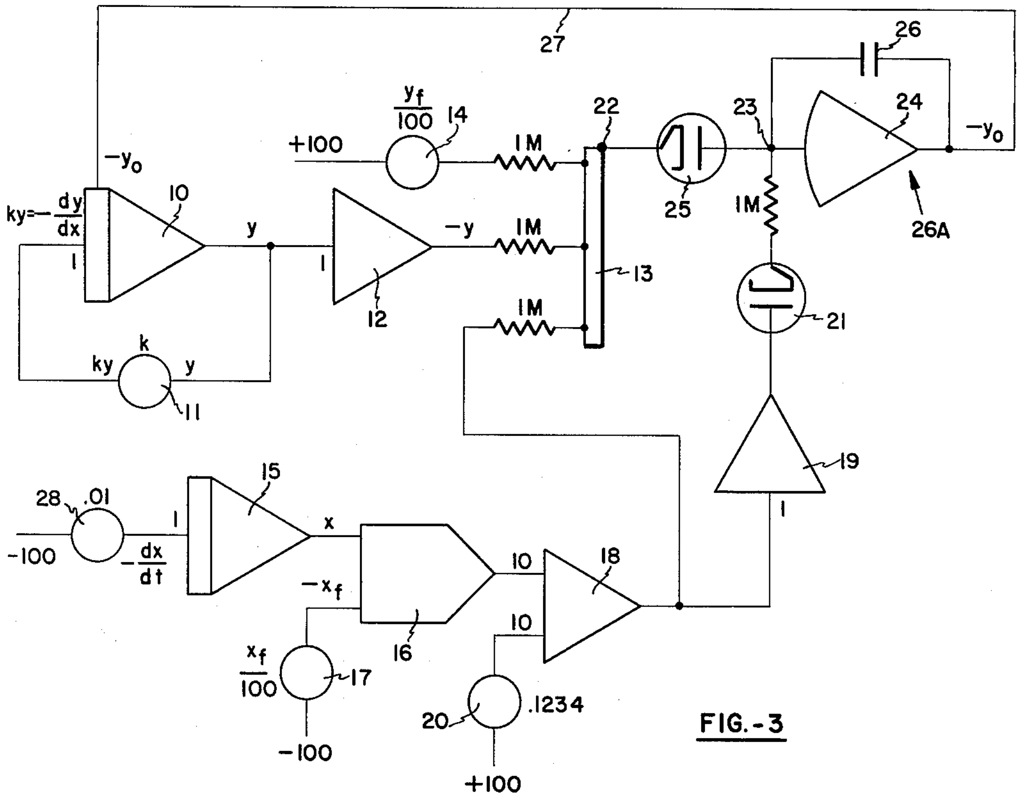
FIGURE 3 shows a schematic wiring diagram for a convergence circuit of the invention in combination with standard computer elements.

To illustrate the invention with respect to a conventional analog computer circuit, FIGURE 3 shows one specific embodiment of an inventive circuit using combinations of conventional computer components. The basic equation $$-ky=\frac{dy}{dx}$$

is fed into integrator 10, which is connected in parallel with potentiometer 11. In analog computer terminology, potentiometers are after referred to as attenuators. Potentiometer 11 is set at a value equivalent to $k$ so that the ultimate effect of integrator 10 and potentiometer 11 is to produce a value $y$ which is referred to as $y$ (calculated).

The value for $y$ (calculated) is fed into sign changing amplifier 12 to change the sign to $-y$ which value is then passed through a 1 megohm resistor to summing bus line 13. Potentiometer 14, into which can be fed +100 volts, is set to a value equal to $$\frac{y_f}{100}$$

so that the output from potentiometer 14 is equal to $y_f$ which output passes through a 1-megohm resistor to summing bus line 13. At integrator 15 (the $x$ integrator) a negative 100 volts is fed into potentiometer 28 which is set at .01 so that the output from potentiometer 28 is equal to −1 which is equal to $$-\frac{dx}{dt}$$

This establishes a one to one correspondence between the unit of $x$ and the unit of computer time. The output from integrator 15 goes into comparator 16 which is a polarity sensing device and can be of any conventional manufacture. Also into comparator 16 is fed the output from potentiometer 17. A negative 100 volts is fed into potentiometer 17 which is set at $$\frac{x_f}{100}$$

so that a minus voltage representing $-x_f$ passes into comparator 16. Comparator 16 generates a square wave pulse which is nonsymmetrical as $x-x_f$ changes polarity and which is fed to amplifier 18. The output from amplifier 18 is then fed into amplifier 19. Since amplifiers 18 and 19 cause signal waves passing through to experience a change of sign, the output from amplifier 18 will have exactly the opposite signal as the output from amplifier 19. Potentiometer 20 is connected to amplifier 18. A +100 voltage is fed through potentiometer 20 which is set at an empirical setting of 0.1234. The output of potentiometer 20 is used to parallax the square wave voltage which is available at the comparator 16 output so that a symmetrical square wave having + and − levels can be obtained at the output of amplifier 18. By symmetrical it is meant with respect to zero. The important characteristic of the square wave is that the peak + and − levels should be larger than 100 volts. With the values given in this particular illustration the + and − levels of the square wave are about +120 and −120 volts. The square wave output of amplifier 18 is connected to amplifier 19 as well as to summing bus line 5 through a 1-megohm resistor. The square wave output from amplifier 19 is connected to crystalline diode 21. Summing bus line 13 is connected to summing junction 22, which will be referred to herein as SJ–22. SJ–22 is connected to the grid point 23 of high gain amplifier 24 by means of crystalline diode 25. Crystalline diode 21 and grid point 23 of amplifier 24 are connected by way of a 1-megohm resistor. In parallel with amplifier 24 is condenser, i.e. capacitor, 26, the combination of which is an integrator which will be referred to herein as convergence integrator 26A.

In operation, $x$ is a value which varies from "0" to just a little more than $x_f$. As long as $x$ is less than $x_f$ a +120 voltage comes off the output of amplifier 18 and a −120 voltage comes off the output of amplifier 19. This is as a result of the square wave coming off comparator 16. The summation of voltages under these conditions at the SJ, or summing junction point 22, is equal to $$+120 \text{ volts}+[(y_f-y)]$$

$y_f-y$ by virtue of initial operating values cannot exceed 100 volts. Therefore, the signal from the output of amplifier 18 will always be, under these conditions, larger than 100 volts and the cathode of diode 25 will be relatively positive with respect to the anode of diode 25 and no voltage can pass through diode 25. Simultaneously a negative 120 volts will be at the anode of diode 21 and, since the anode is relatively negative with respect to the cathode, no voltage will flow through diode 21. Thus, when $x$ is a value which ranges from just shy of $x_f$ to "0" the convergence integrator 26A does not operate. As soon as $x$ becomes equal to $x_f$ or is slightly greater than $x_f$ the voltage at the output of amplifier 18 becomes −120 volts and the voltage at the output of amplifier 19 becomes +120 volts. Then the voltage available at SJ–22 is now $$[-120 \text{ volts}+(y_f-y)]$$

Since the cathode of diode 25 is now relatively negative compared with the anode of diode 25, diode 25 now conducts. At diode 21 a +120 voltage is emitted from amplifier 19 which makes the anode of diode 21 relatively positive and, therefore, diode 21 will conduct. Since both diodes are conducting simultaneously at the grid point of amplifier 24 the voltage at the grid point of amplifier 24 can now be expressed as $$v=-120+(y_f-y)+120$$

The −120 and the +120 cancel out leaving in the expression the difference between the $y$ (known) and $y$ (calculated) at $x=x_f$. Diode 21 is used as a compensating diode at grid point 23 of amplifier 24 to remove the bias voltage that has been added to the value of $y-y_f$ to make diode 25 conduct. This error signal between $y_f$ (known) and $y_f$ (calculated) at $x_f$ is fed into convergence integrator 26A. The signal is only fed into convergence integrator 26A for a very few microseconds, for instance, from 20–50 microseconds. Integrators 10 and 15 used in this example alternately will compute and reset as triggered by the repetitive operation mode of the computer used. The whole operation mentioned above takes place before the computer resets itself. Now the computer resets itself and $x$ goes back to "0." Thus $x$ becomes less than $x_f$ during the resetting time and the square wave signals available at the output of amplifiers 18 and 19 experience a sign change which, in turn, causes diodes 21 and 25 to be nonconductors. Therefore, there is an interruption of the signals going to convergence integrator 26A which causes the value in capacitor 26 to be held and stored. The value in capacitor 26 is directly proportional to the error signal which is the difference between $y_f$ (known) and $y_f$ (calculated) at $x=x_f$.

The value stored in capacitor 26 is conveyed to the initial condition input of integrator 10 along connection 27. This value is $-y_o$ and is electrically conveyed to the initial condition bus of integrator 10, where it has the effect of changing the value $-y_o$ in the direction of reducing the error ($y_f$ calc. $-y_f$ known). It is to be emphasized that integrator 10 represents the tie between the circuit of FIGURE 3 and the circuit in the body of the computer being programmed, not shown. Both the input value to integrator 10, $$-\frac{dy}{dx}$$

and the output $y$ are common with all points in the circuit of the computer being programmed which have these same values. This, by definition, is the basis for representation of mathematical equations on an analog. As integrator 10 is the device which determines the value $$-\frac{dy}{dx}$$

and $y$ through such interactions its variation, affects the remainder of the circuit in the body of the computer performing the computation, to the extent that these points are in common. This value from capacitor 26 which is fed into integrator 10 causes the generation of a new curve in the next repetitive calculation. The generation of a new curve will create a new error signal at $x=x_f$. The cycle is repeated until $y-y_f=0$ at $x=x_f$. Then the voltage available at the output of the convergence integrator 26A which is proportional to the sum of the errors generated respectively at each repeat is equal to the initially unknown value $y_o$ at $x=y_o$. When the error has been completely eliminated, the output of the convergence integrator will remain constant at each repetitive operation. From the foregoing it should be clear that the circuit of the invention operates as an adjunct to a main analog computer. This point is emphasized in order that the operation of the circuit of the invention is not confused with the programming of the main computer.

Figure 4:
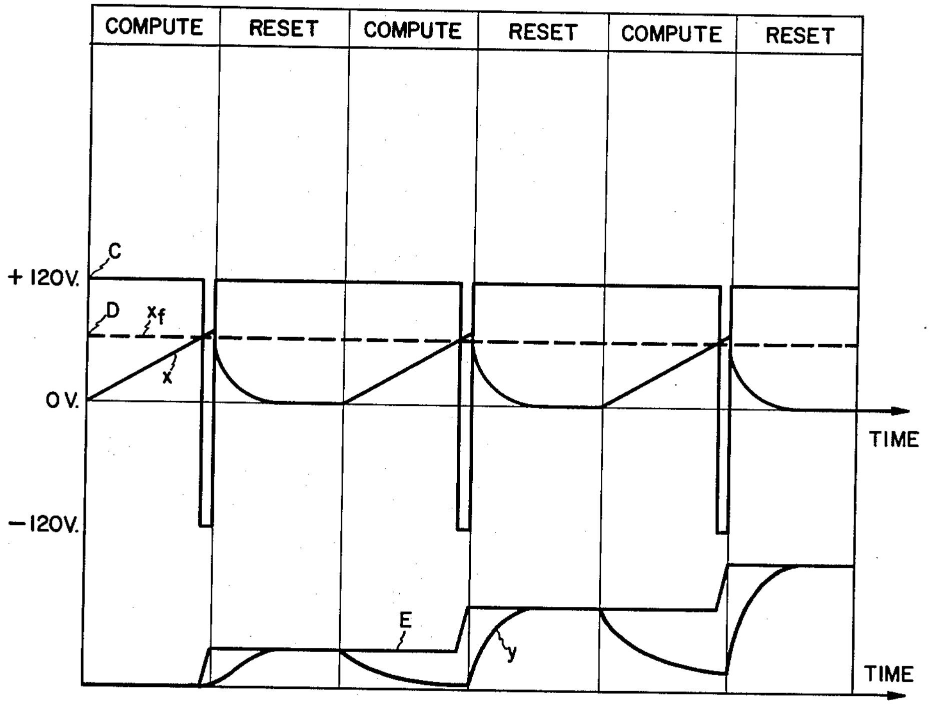
FIGURE 4 shows a graph of the output of the convergence integrator.

The operation of the convergence circuit of the invention is graphically illustrated by FIGURE 4, in which the square wave is represented as starting at point C; $x_f$ is a value which remains constant at point D; $x$ is a value which approaches $x_f$. As it reaches $x_f$ and extends slightly beyond $x_f$ it causes a change in the polarity of the square wave during which time the convergence integrator 26A is permitted to operate by diodes 21 and 25. Then the repetitive nature of the computer exerts itself and the operation is repeated which causes the square wave to reverse polarity so that the convergence integrator 26 output is that of its capacitor 26.

As $x$ approaches $x_f$ on the new computer cycle there is a reversal of polarity and the convergence integrator produces a new output. This cycle is repeated until there is a series of compute and reset cycles where the convergence integrator 26A output remains unchanged. The convergence integrator 26A output is represented by line E. The $y$ output from integrator 10, as the input to integrator 10 is continuously changed by the convergence integrator 26A is shown by curve $y$.

All the specific examples herein of the operation of the invention are given with respect to the 231 R PACE Analog Computer manufactured by Electronic Associates, Inc., Long Branch, New Jersey. However, other computers of different design and manufacture can be used as will be apparent to one skilled in the art.

Utilizing the convergence circuit in conjunction with the 231 R PACE Analog Computer, it should be observed that if a 10 millisecond compute time interval and a 10 millisecond reset time interval is employed simultaneous conversions on all unknown quantities can be obtained in less than one second. The output of potentiometer 17 is the value of $x_f$. At this point switching of the polarity of the square wave is expected to occur. It is preferred in this example that $x=x_f$ be reached about 200 microseconds before the computer resets itself.

Also in the specific example given above the polarity of the voltage level from +120 to −120 volts will occur in approximately 130 microseconds. This is a limitation inherent in the amplifier used in the 231 R PACE Analog Computer. This particular amplifier has a frequency response limitation of approximately 20 kilocycles per second (kc./s.). If faster switching is desired, a higher frequency response amplifier can be used. Once converged, fixed known values can be allowed to vary over their entire range at a speed 20 to 30 times slower than the convergence time. All convergence integrators will then maintain convergence criteria but outputs will vary as known conditions vary.

In conventional operation with the 231 R PACE Computer the output from comparator 16 of FIGURE 1 is available at the —J patch panel pin. In the preferred version of the invention the voltage is drawn directly from the coil of comparator 16 to form a rapid square wave pulse.

Although the above-described example demonstrates the applicability of the convergence technique on a boundary condition, the technique is also highly suitable for use for converging on a parameter value also. Thus, in the original expression $$\frac{dy}{dx}=-ky$$

suppose it is known that $y$ is equal to $y_0 @ x$ is equal to $y_0$ and $y$ is equal to $y_f @ x$ is equal to $x_f$. The question to be determined is what is $k$?

Figure 5:
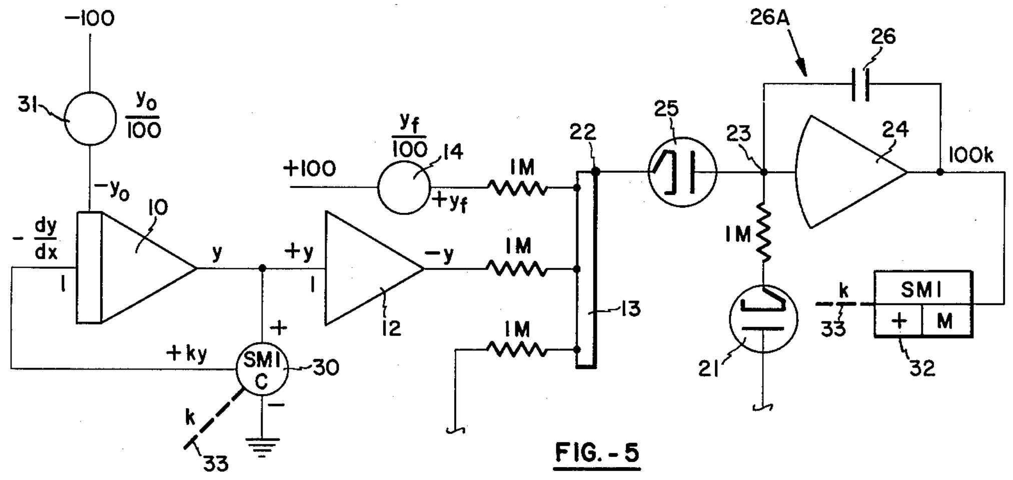
FIGURE 5 is a schematic wiring diagram similar to FIGURE 3 except that a parameter value is adjusted instead of a boundary condition.

Reference is now made to FIGURE 5. FIGURE 5 is identical to FIGURE 3 with the exception of the following. Potentiometer 11 is replaced by servo multiplying cup 30, connection 27 between convergence integrator 26A and integrator 10 has been opened and in this line is placed potentiometer 31 which now sets the $y_0$ condition (initial condition) on integrator 10, since this is now known. The output from convergence integrator 26A goes into servo multiplier SM1. The servo multiplier control circuitry 32 will position the servo multiplier shaft 33 to a value directly proportional to the output of integrator 26A. Through internal shaft connection the servo multiplier cup 30 will correspond to the position of servo multiplier shaft 33.

Thus it will be noted that integrator 10 has an initial condition that is available from the output of potentiometer 31. Since the parameter $k$ is unknown it cannot be set on a potentiometer as was the case in the previous example. Instead $k$ is adjusted by replacing potentiometer 11 by servo multiplier cup 30 and feeding the output of the convergence integrator 26A to the servo multiplier SM1. For purposes of this example this output will be called 100K. The shaft position of the servo multiplier SM1 will then correspond to $$\frac{100k}{100}$$

which is equal to $k$. Then an adjustment will take place on servo multiplier cup 30. Repetitive calculations will yield smaller and continuously smaller error signals. These error signals are accumulated in capacitor 26. Once the calculated profile of the expression passes through $y_f @ x=x_f$ the error signals are from that point on "0." No further changes will occur at the output of the convergence integrator 26A. The servo multiplier shaft 33 will then stay at a fixed position which corresponds to the actual value of $k$. It will be appreciated that relatively inexpensive, fast responding, electronic multipliers can be used in place of the very accurate servo multiplier of the example. It will also be understood that the concepts of the above-described invention can be applied to extremely complex problems such as multivariable moving boundary value problems encountered in large-scale chemical processes such as hydrofining, powerforming, and the like as well as kinetic and process simulations where large complex trial-and-error techniques are now necessary as well as other areas of difficult control problems.

Although the foregoing specification has described the invention with a certain degree of particularity, it will be understood that numerous modifications and variations therein can be employed without departing from the spirit of the invention as hereinafter claimed.

What is claimed is:

1. In a substantially analog type of repetitive computer having at least one $y$-type and at least one $x$-type computing circuits, the improvement which comprises in electrical combination:

(a) Convergence integrating means for receiving an error signal (b) Switching means for said integrating means, wherein said integrating means is operative only when the output of said $x$-type computing circuit is a certain predetermined value to provide for compute time intervals and reset time intervals (c) Circuit means including at least one of said $y$-type computing circuits, the output of which is an error signal which is the difference between a calculated value and a known value at said certain predetermined value, said output being connected with said integrating means (d) Means to adjust said $y$-type circuit responsive to the output of said integrating means (e) Means of introducing values into said $x$-type and said $y$-type computing circuits.

2. The improvement of claim 1 wherein said computer is a general purpose analog computer.

3. The improvement of claim 1 wherein said integrating means is a high gain amplifier with a condenser in parallel relationship.

4. The improvement of claim 1 wherein said switching means is a pair of diodes.

5. The improvement of claim 1 wherein said circuit means of subparagraph (c) comprises in combination:

(a) An integrator (b) A first potentiometer in parallel relationship with said integrator (c) A second potentiometer (d) An amplifier wherein the output from the combination of said first two elements is changed in sign, and wherein the output from said amplifier and the output from said second potentiometer are combined prior to passing to said integrating means.

6. The improvement in the convergence circuit of claim 1 wherein said means to adjust said $y$-type circuit is a servo multiplier.

7. In an electronic repetitive analog computer having at least one $y$-type and at least one $x$-type computing circuit, the improvement which comprises in electrical combination:

(a) First circuit means comprising a high gain amplifier with a condenser in parallel relationship for receiving an error signal (b) A pair of diodes as switching means for said first circuit means so that said amplifier and said condenser can be operative only when the output of said $x$-type computing circuit is a certain predetermined value to provide for compute time intervals and reset time intervals (c) Second circuit means including at least one of said $y$-type computing circuits, said computing circuits comprising an integrator and potentiometer, the output of said means is an error signal being the difference between a calculated value and a known value at said certain predetermined value, said output being converted with said first circuit means.

(d) Means to adjust said $y$-type circuit responsive to the output of said condenser.

(e) Means of introducing values into said $x$-type and said $y$-type computing circuits.

8. Repetitive electrical analog computer apparatus for solving mathematical equations representing physical problems comprising in combination:

(a) First integrating means (b) Second integrating means (c) Third integrating means for integrating an error signal (d) Switching means for said third integrating means wherein said third integrating means is operative only when the output from said second integrating means is a predetermined value to provide for compute time intervals and reset time intervals (e) Circuit means including said first integrating means, the output of said circuit means being the difference between a value calculated by said first integrating means and a known value at said predetermined value, said output being an error signal which is connected to said third integrating means (f) Means to adjust said first integrating means responsive to the output of said third integrative means (g) Means of placing variable values into said integrating means.

9. The apparatus of claim 8 wherein said integrating means are amplifiers with condensers in parallel and said first integrating means also has a potentiometer in parallel with an amplifier.

10. The apparatus of claim 8 wherein said means of placing said values into said integrating means comprises potentiometers.

11. The apparatus of claim 8 wherein said switching means is a pair of diodes.

References Cited by the Examiner

UNITED STATES PATENTS 2,513,537 7/50 Williams ------------- 318—558

OTHER REFERENCES

"Analog Computation," Jackson, McGraw Hill Book Co., Inc. 1960, (pages 55–60 relied on).

"Bell Laboratories Record," A. A. Currie, March 1951. (page 104 relied on).

MALCOLM A. MORRISON, *Primary Examiner.*